United States Patent [19]

Althausen et al.

[11] Patent Number: 5,840,778
[45] Date of Patent: Nov. 24, 1998

[54] PROCESS AND DEVICE FOR PRODUCING FOAM USING CARBON DIOXIDE DISSOLVED UNDER PRESSURE

[75] Inventors: Ferdinand Althausen, Neunkirchen; Reiner Raffel, Siegburg; Wilfried Ebeling; Robert Eiben, both of Köln, all of Germany

[73] Assignees: Bayer Aktiengesellschaft; Hennecke GmbH, both of Leverkusen, Germany

[21] Appl. No.: 836,859

[22] PCT Filed: Nov. 15, 1995

[86] PCT No.: PCT/EP95/04492

§ 371 Date: May 21, 1997

§ 102(e) Date: May 21, 1997

[87] PCT Pub. No.: WO96/16782

PCT Pub. Date: Jun. 6, 1996

[30] Foreign Application Priority Data

| Nov. 28, 1994 | [DE] | Germany | 44 42 254.7 |
| Dec. 23, 1994 | [DE] | Germany | 44 46 336.7 |
| Jan. 5, 1995 | [DE] | Germany | 195 00 198.2 |
| Jul. 5, 1995 | [DE] | Germany | 195 24 434.6 |

[51] Int. Cl.$^6$ .............................. C08J 9/00; C08G 18/00
[52] U.S. Cl. .............................................. 521/99; 521/155
[58] Field of Search ......................................... 521/99, 155

[56] References Cited

U.S. PATENT DOCUMENTS

| 3,184,419 | 5/1965 | Merriman | 260/2.5 |
| 4,337,318 | 6/1982 | Doyle | 521/80 |
| 5,055,272 | 10/1991 | Wheeler et al. | 422/133 |
| 5,118,720 | 6/1992 | Wheeler et al. | 521/99 |
| 5,206,082 | 4/1993 | Malone | 428/294 |
| 5,356,565 | 10/1994 | Southwell | 252/307 |
| 5,578,655 | 11/1996 | Fiorentini | 521/155 |
| 5,620,710 | 4/1997 | Florentini et al. | 425/4 |
| 5,629,027 | 5/1997 | Florentini et al. | 425/4 |
| 5,639,483 | 6/1997 | Florentini et al. | 425/4 |
| 5,643,970 | 7/1997 | Sulzbach et al. | 521/155 |
| 5,665,287 | 9/1997 | Florentini et al. | 264/53 |

FOREIGN PATENT DOCUMENTS

| 145250 | 6/1985 | European Pat. Off. . |
| 2628785 | 12/1977 | Germany . |
| 803771 | 10/1958 | United Kingdom . |

*Primary Examiner*—Morton Foelak
*Attorney, Agent, or Firm*—Joseph C. Gil; Noland J. Cheung

[57] ABSTRACT

A process is described for producing foam materials from two-component reactive plastics using carbon dioxide as blowing agent by mixing at least one of the reactive components with carbon dioxide under pressure, mixing the components, at least one of which contains carbon dioxide under pressure, expanding the reactive mixture containing carbon dioxide obtained by mixing, and hardening, wherein the expansion takes place suddenly with the production of high rates of shear. Preferably the rate of flow of the reaction mixture is reduced after expansion.

7 Claims, 11 Drawing Sheets

PROCESS AND DEVICE FOR PRODUCING FOAM USING CARBON DIOXIDE DISSOLVED UNDER PRESSURE

The present invention relates to a process and a device for producing foams using carbon dioxide dissolved under pressure as blowing agent, wherein the material to be expanded is mixed under pressure with preferably liquid carbon dioxide and is then expanded with the formation of foam. Liquid starting materials for plastics are preferably used as materials which can be expanded and which can be hardened by means of a polyaddition or polycondensation reaction, which is initiated after expansion, to give foamed plastics. The invention relates in particular to polyurethane foams.

When producing polyurethane foams, at least one of the reactive components (polyisocyanate and compounds which contain isocyanate-reactive hydrogen atoms, in particular polyols) is mixed with a liquid or gaseous blowing agent, then mixed with the other component and the mixture obtained is fed either batchwise into a mould or continuously onto a conveyer belt, where the mixture expands and hardens.

There are a number of processes with widespread application in industry for producing foam materials. On the one hand, liquids which evaporate at low temperature, such as low molecular weight chlorinated hydrocarbons, methylene chloride, pentane etc. are used, which evaporate out of the still liquid reaction mixture and form small bubbles (physical foam production). Furthermore, air can be beaten into the reactive mixture or into one of the components (mechanical foam production) and finally water may be added to the polyol component as a blowing agent during polyurethane foam production, which releases carbon dioxide as the foam-producing gas after being mixed with the isocyanate component due to reaction with the isocyanate (chemical foam production).

For reasons of environmental compatibility and occupational hygiene and because of the comparatively high solubility of liquid carbon dioxide in the polyol component, liquid carbon dioxide has already been proposed as a blowing agent on several occasions (GB-A 803 771, U.S. Pat. No. 3 184 419). However, carbon dioxide has not hitherto been used in industry, evidently due to the difficulties involved in producing uniform foams when the pressure in the reactive mixture is, as required, reduced from pressures of between 10 and 20 bar. The problem is that on the one hand the carbon dioxide evaporates relatively suddenly immediately after reducing the pressure, so there is a very large increase in the volume of the reaction mixture, by a factor of for example about 10, which is difficult to control and on the other hand there tends to be time-lags—which may be 3 to 6 bar below the equilibrium vapour pressure of $CO_2$ at the particular temperature—in the release of carbon dioxide from the reactive mixture, so that sudden, explosive releases of carbon dioxide occur with the result that large blisters or voids are included in the expanded material.

According to DE-A 2 628 785, the introduction of air into the polyol component, before carbon dioxide is dissolved therein, has already been suggested, evidently to provide nuclei for the release of carbon dioxide.

According to EP-A 145 250, the ability of carbon dioxide to form adducts with water and other low molecular weight liquids is utilised, in order to produce the delayed release of carbon dioxide from the reactive mixture so that foam formation due to the release of carbon dioxide begins only after the pressure has been reduced in the reactive mixture. After destruction of the adduct, the water is then available as an additional chemical blowing agent. However, the controllability of foam formation in a large scale process is not really improved by this procedure because both the formation of the adduct and its decomposition are extremely labile in the presence of the other conditions prevailing in the reactive mixture, except when using adducts prepared in a separate step, which are also described in the said reference, with the aid of low molecular weight tertiary amines which apparently have a considerably extended decomposition time as compared with spontaneously formed water/$CO_2$ adducts.

Combinations of physically dissolved carbon dioxide and other physical or chemical blowing agents which boil at low temperature, such as water or chlorinated hydrocarbons, are also proposed, in accordance with EP-A 89796.

None of these proposals has led to industrially applicable solutions for the use of $CO_2$ physically dissolved under pressure, as a blowing agent for the production of polyurethane foams.

The tests underlying the present invention were based on the concept that the conditions under which the polyurethane reactive mixture containing $CO_2$ under pressure is expanded have an essential effect on the formation of the foam.

According to U.S. Pat. No. 3 184 419, the pressurised reactive mixture containing carbon dioxide which emerges from the mixing device is evidently suddenly expanded through a valve. According to EP-A 145 250, expansion should take place gradually, it being possible for the gradual reduction in pressure to take place while the reactive mixture containing carbon dioxide flows through a pipe. In this case release of some of the gas while still inside the pipe is not necessarily regarded as a disadvantage because this process may assist the formation of bubble nuclei. Within the context of the tests underlying the present invention, it has however been shown that such a premature, i.e. spontaneous and non-induced, formation of bubble nuclei is rather disadvantageous for the pore structure of the foam because such a spontaneous formation of bubble nuclei generally results in a foam which not only has a very variable pore structure, but which also has large holes and voids.

On the basis of these and other observations, the following requirements were placed on the development of a process for preparing foam materials made from two-component reactive plastics using carbon dioxide which is physically dissolved under pressure as a blowing agent:

1. The formation of bubble nuclei in the liquid two-component reactive mixture must be controlled in such a way that every bubble nucleus produced can participate in an identical manner in the release of carbon dioxide from the reactive mixture, so that as uniform pores as possible are produced.
2. When inducing bubble nuclei, the number of bubble nuclei produced should already correspond to the number of pores in the hardened expanded plastic material.
3. The controlled, induced production of bubble nuclei must take place at that moment in time at which the liquid reactive mixture changes from a state which is not saturated with dissolved carbon dioxide to a state in which it is supersaturated with carbon dioxide, i.e. at that moment in time at which it expands from a pressure above the saturation pressure of the dissolved carbon dioxide to a pressure which is below the saturation pressure of the dissolved carbon dioxide.
4. Immediately after the formation of nuclei, the greatest possible degree of supersaturation of dissolved carbon dioxide should be produced in the reactive mixture. i.e.

expansion from a pressure above the equilibrium pressure of the dissolved carbon dioxide to ambient pressure should take place as fully instantaneously as possible.

It was found that the requirements mentioned above can be satisfied when the reactive mixture which contains carbon dioxide dissolved under pressure is expanded with the production of high rates of shear in the reactive mixture.

Accordingly, the present invention provides a process for producing foam materials from two-component reactive plastics using carbon dioxide as a blowing agent by mixing at least one of the reactive components with carbon dioxide under pressure, mixing the reaction components while maintaining a pressure which is greater than that of the saturation pressure of the carbon dioxide in the mixture, expanding the reactive mixture containing carbon dioxide and hardening, characterised in that expansion is performed suddenly with the production of high rates of shear.

The rates of shear produced during expansion should be at least $10^4$/second, in particular at least $10^5$/second. Rates of shear of greater than 106/second are particularly preferred.

A means which is suitable for expansion and for producing high shear rates is at least one passageway for the reactive mixture with a size in at least one dimension of less than 1 mm, preferably 0.05 to 0.5 mm, more preferably 0.1 to 0.3 mm and most preferably 0.08 to 0.15 mm.

The at least one passageway may be designed in the form of a fine-mesh sieve, a perforated plate, a slotted grid or an extended slit. The extension of the passageway in the direction of flow should be minimal. Preferably the extension in the direction of flow should be no larger than 1 mm, and most preferably no larger than 0.5 mm. Perforated plates with a thickness of 0.1 to 0.5 mm are particularly suitable. In the case of longitudinally extended slits it is usually necessary, due to fabrication requirements, for their dimensions in the direction of flow to be 0.5 to 1 mm.

The difference in the pressure of the reactive mixture upstream and downstream of the passageway is usually between 5 and 20 bars, preferably 7 to 15 bars, and most preferably 8 to 12 bars.

The shear rate is the gradient of the rate of flow transversely to the direction of flow The rate of shear for a slit can be approximately calculated from the free (open) cross-sectional area Q of the opening and the volume flow V passing through the opening by assuming a linear flow profile. The rate of shear for a slit of slit width D is therefore:

$S=2 \dot{V}/Q:1/2D$ (approximation for a flow profile in the form of a triangle with sides of identical lengths).

The rate of shear for a perforated plate with n openings of a radius R and a cross-sectional area q is:

$S=3 \dot{V}/n \cdot q:R$ (approximation for a flow profile in the form of a circular pyramid).

The two-component reactive plastics material is preferably a polyurethane plastics material produced by the polyisocyanate-polyaddition process.

Although the high rate-of shear which is produced as the reactive mixture passes through the at least one opening with a low cross-sectional size is generally sufficient to obtain a sufficiently large number of bubble nuclei, it can be advantageous to produce additional bubble nuclei in the customary manner by introducing air or nitrogen into at least one of the reaction components of the reaction mixture before they are mixed, in particular, for example, when insufficient supersaturation with dissolved $CO_2$ is produced as the mixture passes through the at least one opening of small cross-sectional size as a result of a low content of $CO_2$ in the reactive mixture.

In order to obtain an as high as possible supersaturation of the reactive mixture as it passes through the at least one opening with a small cross-sectional size, the pressure of the reaction mixture prior to its entry through the opening should therefore only be slightly higher than the saturation vapour pressure of the dissolved carbon dioxide. If therefore, according to a preferred variant of the invention, carbon dioxide is only dissolved in the polyol component for producing the reaction mixture containing carbon dioxide, the pressure of the reaction mixture is reduced, by means of a pressure-reducing valve, after it issues from the mixing apparatus in which the polyol and isocyanate components are mixed, to a pressure slightly higher than the saturation vapour pressure of the mixture, which can for example be between 60 and 80% of the saturation vapour pressure of the polyol component containing carbon dioxide (upstream of the mixing apparatus).

Aliphatic, cycloaliphatic, araliphatic, aromatic or heterocyclic polyisocyanates, such as are described, for instance, by W. Siefken in Justus Liebigs Annalen der Chemie, 562, pages 75 to 136 are used as component A.

Aromatic polyisocyanates are preferably used, particularly preferably polyisocyanates which are generally readily obtainable industrially, e.g. 2,4- and 2,6-toluylene diisocyanate and any mixtures of these isomers ("TDI"), polyphenyl-polymethylene polyisocyanates, of the kind prepared by aniline/formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluylene diisocyanate.

The second component B ("polyol component") consists of compounds containing at least two hydrogen atoms which are capable of reacting with isocyanates and have molecular eights generally between 60 and 5000, preferably between 100 and 2000, in particular between 200 and 800. These are understood to include, in addition to compounds containing amino groups, thiol groups or carboxyl groups, preferably compounds containing hydroxyl groups, in particular compounds containing 2 to 8 hydroxyl groups, especially those having molecular weights between 200 and 2000, preferably 300 to 1200, e.g. polyesters, polyethers, polythioethers, polyacetals, polycarbonates and polyesteramides having at least 2, generally 2 to 8, but preferably 2 to 6, hydroxyl groups, of the kind known per se for producing polyurethane foams; polyether polyols are quite specifically preferred.

Compounds which are suitable for use as the polyol component are described on pages 6 to 9 of EP-B 121 850.

Furthermore, water, other blowing agents, foam stabilisers, catalysts and other auxiliary agents and additives known per se may optionally be used to prepare the reactive mixture. These additional agents known per se which can be used are disclosed on pages 9 to 11 of EP-B 121 850.

According to the invention, water is particularly preferably used as an additional blowing agent in an amount of most preferably 1 to 7 wt.%, based on the reactive mixture. Water is particularly preferably used in an amount of 2 to 5 wt.%.

The additional agents which can be used can be supplied separately to the mixing apparatus for mixing the isocyanate component and the polyol component or else are mixed with one of the two main components before mixing the isocyanate with the polyol, wherein additional water and any other additional components which react with isocyanate should only be admixed with the polyol component.

The process technology for preparing polyurethane foams is described in principle in Becker/Braun, Kunststoff-Handbuch, vol. 7: Polyurethane, 1993, pages 143 to 149, in particular in FIG. 4.8 and FIG. 4.9 on page 148.

The components are preferably mixed in a so-called low pressure stirred mixing chamber, wherein according to the invention the pressure prevailing in the mixing chamber is greater than the saturation pressure of the dissolved carbon dioxide.

Carbon dioxide is dissolved in one or more of the components, in particular the polyol component, before introducing the components into the mixing head. Carbon dioxide is preferably dissolved in an amount of 1 to 7 wt.%, preferably 2 to 5 wt.%, based on the total reactive mixture. Dissolution of carbon dioxide, preferably only in the polyol component, may take place in any manner, e.g.

a) gaseous carbon dioxide is mixed into the polyol using a stirrer in a container holding the polyol component which is maintained at a pressure of 15 to 25 bar;

b) liquid carbon dioxide is mixed with the polyol at room temperature, e.g. in a static mixer at a pressure of 70 to 80 bar, and then expanded to a pressure of 15 to 25 bar before introduction to the low pressure stirred mixing head;

c) liquid carbon dioxide, cooled to e.g. $-20°$ C., is mixed with the polyol component which is at room temperature at a pressure of 15 to 25 bar, wherein mixing is performed in such a way that the carbon dioxide is dissolved in the polyol component before it can evaporate.

It was found that the preferred alternative c) is particularly successful, due to the high tendency of the carbon dioxide to go into solution, using a high-speed flow stirrer which is located in the polyol pipeline at the inlet point for the liquid carbon dioxide.

The components in the reactive plastics material, at least one of which contains the dissolved carbon dioxide, are now fed to the mixing head, mixed therein and expanded on issuing from the mixing head with the production of the high rates of shear according to the invention. For this purpose, the at least one passageway with a small cross-sectional size in at least one dimension, is located at the outlet of the mixing head. The exit opening is preferably a slit or a sieve plate with a small cross-sectional size. The reactive mixture containing carbon dioxide passing through the slit expands immediately after passing through the slit within a very short time which may be in the range $1/10$ to $1/1000$ seconds. In this case essentially all the dissolved carbon dioxide present is released, thereby producing a foam with a relatively uniform foam structure.

Provided the composition of the reactive mixture favours the spontaneous production of $CO_2$ adducts, e.g. with compounds which contain hydroxyl groups, additional $CO_2$ is released at a time delayed by the requisite decomposition time of the adducts, which leads essentially to enlargement of the foam bubbles already present. When using water as an additional chemical blowing agent, the foam "rises" further at the start of the isocyanate reaction with water.

The reactive mixture, which is suddenly expanded with a pressure drop of 5 to 15 bar and the production of high rates of shear, has a relatively high speed of more than 5 m/sec. and in particular 10 to 50 m/sec. It is suitable, in this form, for the spray-coating of e.g. flat textile structures or moulded items.

To produce slabs of foam of greater thickness, the high rate of flow of the reaction mixture emerging from the at least one opening with a small size in at least one direction is preferably reduced, in particular to $1/5$ to $1/100$ of the exit speed.

The reduction in exit speed should take place within times which are sufficiently short, after emergence from the at least one opening with a small size in at least one direction, for any major release of the carbon dioxide still not to have taken place. The speed reduction preferably takes place within 0.01 seconds after passing through the at least one opening with a small size, more preferably within less than 0.003 seconds and in particular within less than 0.001 seconds.

The speed reduction can be brought about by directing the stream of reactive mixture containing dissolved carbon dioxide emerging from the at least one opening with a small cross-sectional size in at least one direction onto an impact surface at which the stream is deflected by an angle of at least 70°, preferably of about 90°. On striking the impact surface, the high rate of linear flow of the directed stream is destroyed and changed into a highly turbulent, essentially non-directional flow.

The distance of the impact surface from the outlet of the at least one opening with a small cross-sectional size may be less than 2 cm, preferably less than 1 cm, so that the flow reduction can take place within the short times according to the invention after producing the high shear forces.

The highly turbulent flow prevailing in the reactive mixture after striking the impact surface is particularly preferably stabilised before any substantial release of dissolved carbon dioxide takes place. Stabilising the turbulent flow may be brought about by passing the material through a stabilisation sieve. In this case, the stabilisation sieve should have a large enough free area of passage for the reactive mixture containing carbon dioxide to experience a minimal drop in pressure while passing through the stabilisation sieve. In particular, the stabilisation sieve should have a free cross-sectional area, i.e. a sum of the cross-sectional areas of all passageways, which is 5 to 100 times larger than the total cross-sectional area of the at least one opening with a small cross-sectional size in at least one direction used to produce the high rates of shear.

Preferred means for producing the particularly preferred combination of steps according to the invention a) producing high rates of shear b) reducing the rate of flow, and c) stabilising the flow of the mixture can be arranged in the following manner:

1. The at least one opening with a small cross-sectional size in at least one direction is a slit. Following this is a flow reduction chamber which has a sieve or perforated plate which is parallel to the passageway through the slit. The flow reduction chamber is preferably of such a size that the average residence time in the flow reduction chamber is less than 0.1 sec, preferably less than 0.02 sec, in particular between 0.005 and 0.02 sec.

2. A sieve or a perforated plate with a number of passageways with a diameter of preferably about 0.1 mm is used to produce the high rates of shear. The stabilisation sieve or perforated plate for stabilising the flow is arranged parallel to the sieve or the perforated plate for producing the high rates of shear and at a distance of less than 2 mm, preferably less than 1 mm. The free cross-sectional area, i.e. the sum of the cross-sections of all the passages through the sieve for producing the rates of shear, may then be between 0.5 and 5% of the area of the sieve. The free cross-sectional area of the stabilisation sieve may preferably be at least 5 times, and preferably 10 to 50 times, that of the free cross-sectional area of the sieve for producing the high shear forces.

The small cross-sectional size in at least one direction of the at least one opening for producing the high shear forces, the pressure drop when passing through the opening, the viscosity of the reactive mixture and the high rate of shear produced are not independent quantities. In particular the pressure drop must be such that the pressure of the reactive mixture before passage through the opening is above the saturation pressure of the dissolved carbon dioxide. Although it is possible, in principle, to ensure an adequate pressure drop by reducing the small size of the at least one passageway, there are technological restrictions with regard to the degree of reduction in this size, in particular the tendency of the opening to block as the cross-sectional size becomes smaller. As regards reducing the small size of the opening, therefore, according to the invention it is preferred that several sieves or slits are arranged in sequence in order to guarantee the minimum pressure drop required. The several slits or sieves are arranged so closely together that essentially complete depressurisation takes place within a period of less than $10^{-3}$ sec, preferably less than $10^{-4}$ sec.

The passageways are preferably designed to be of the type that widen out in the form of a nozzle on the exit side so that the flow of reactive mixture is spread along the contour of the nozzle and fanned out. This means that flow dead-spaces in between the sieves or perforated plates are avoided and large deviations from the average residence time between the sieves or perforated plates are avoided.

To avoid blocking the at least one opening for producing high shear forces, a sieve may be fitted between the mixing chamber outlet and the at least one passageway, on which solid particles entrained out of the mixing chamber with the reactive material are trapped. The mesh size of the "cleansing sieve" should at least be not substantially greater than the small cross-sectional size of the at least one opening for producing high shear forces. The free cross-sectional area of the sieve, i.e. the sum of the cross-sectional areas of all the sieve mesh, should be large enough for the pressure drop when passing through the cleansing sieve to be negligible, i.e. less than 1 bar.

To avoid blockage of the cleansing sieve during a longer period of operation of the unit it is also possible for the cleansing sieve to be replaced periodically or continuously during the operation of the unit. For this purpose it is possible for a cassette to be arranged transversely to the feed line for the reactive mixture from the mixing chamber exit to the foaming device, and for the cleansing sieve to be wound off a roller in the cassette, passed via sliding seals into and out of the feed line, and wound onto a second roller. The rollers arranged on either side of the feed line can be encapsulated and the individual capsules filled with a liquid, such as for example a polyol, under the same pressure as that prevailing in the feed line, so that essentially the same pressure prevails on both sides of the sliding seals.

The invention is explained in more detail in the following with the aid of the attached figures.

Figure 1:
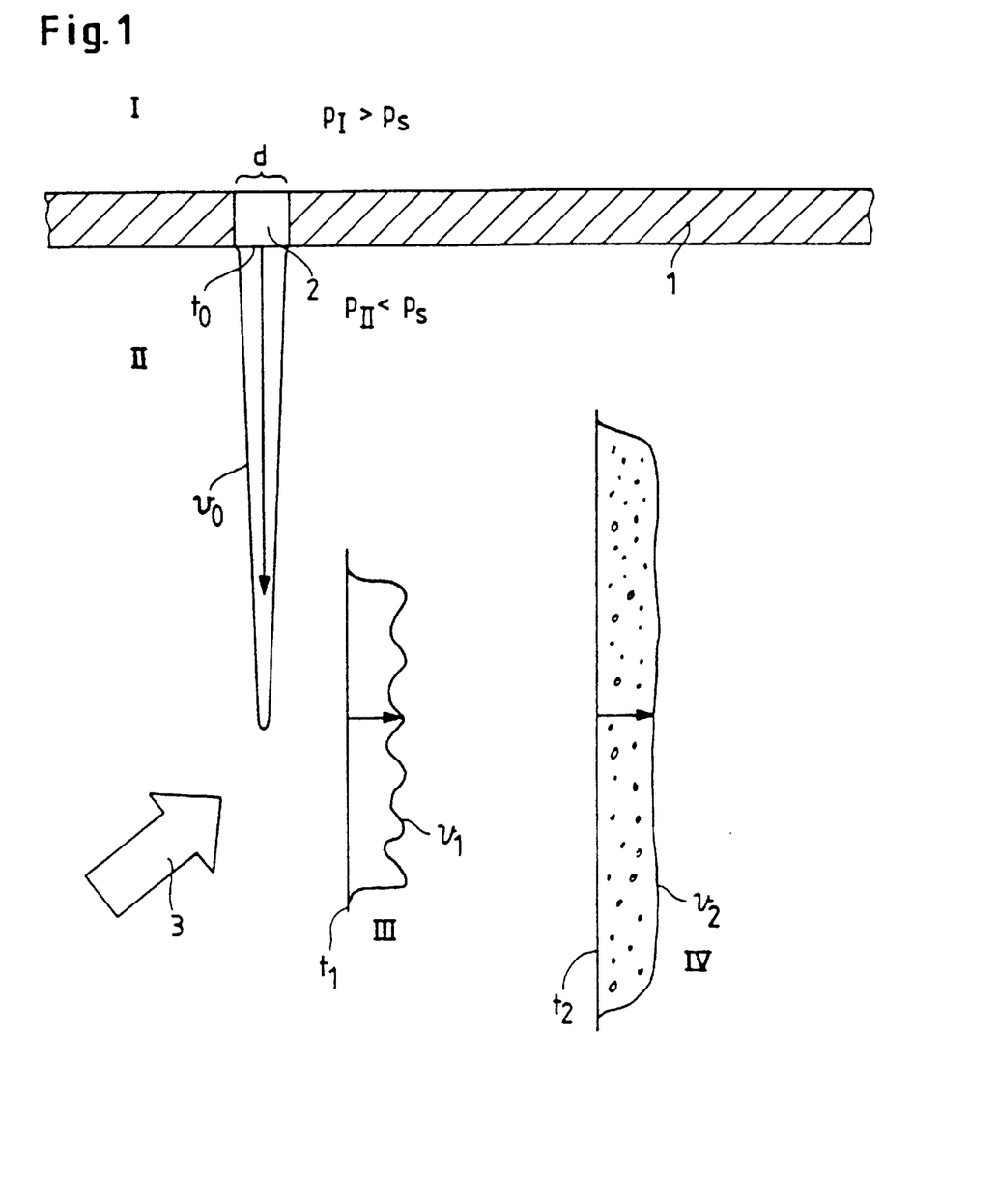
FIG. 1 shows the principle of the process steps according to the invention.

FIG. 1 shows schematic diagrams of four states I, II, III and IV of the reactive mixture. After mixing the components of the reactive mixture in a suitable mixing apparatus, the mixture enters a distribution chamber-indicated by wall 1. It is then in state I, at a pressure which is greater than or at least equal to the saturation pressure of the dissolved carbon dioxide. The saturation pressure of carbon dioxide, for a carbon dioxide content of 3%, is about 7.5 bar. The pressure in the distribution chamber in state I is therefore greater than or equal to 7.5 bar. It may be e.g. 8 to 12 bar. Wall 1 of the distribution chamber has an opening 2 with a small cross-sectional dimension d in at least one direction. On the other side of opening 2 a pressure $P_{II}$ prevails, which is less than the saturation pressure of the dissolved $CO_2$, preferably approximately atmospheric pressure of 1–2 bar absolute. Due to the pressure difference between the two sides of opening 2, the reactive mixture is forced through the opening with the production of high shear forces. At the exit from opening 2, the velocity profile $V_0$ at time $t_0$ of reactive mixture emerging from opening 2 via dimension d is shown (state II). Within a short time, during which still essentially no carbon dioxide is released from the reactive mixture now supersaturated with carbon dioxide, the stream of reactive mixture emerging from opening 2 is turned through an angle as indicated by functional arrow 3 and the speed is reduced, wherein the reactive mixture still containing dissolved carbon dioxide is converted into state III, which is drawn in the form of a diagrammatic velocity profile $v_1$ over the width of the flow of reactive mixture at time $t_1$ after being deflected. Finally, in state IV, the dissolved carbon dioxide is released with the formation of bubbles.

Figure 2:
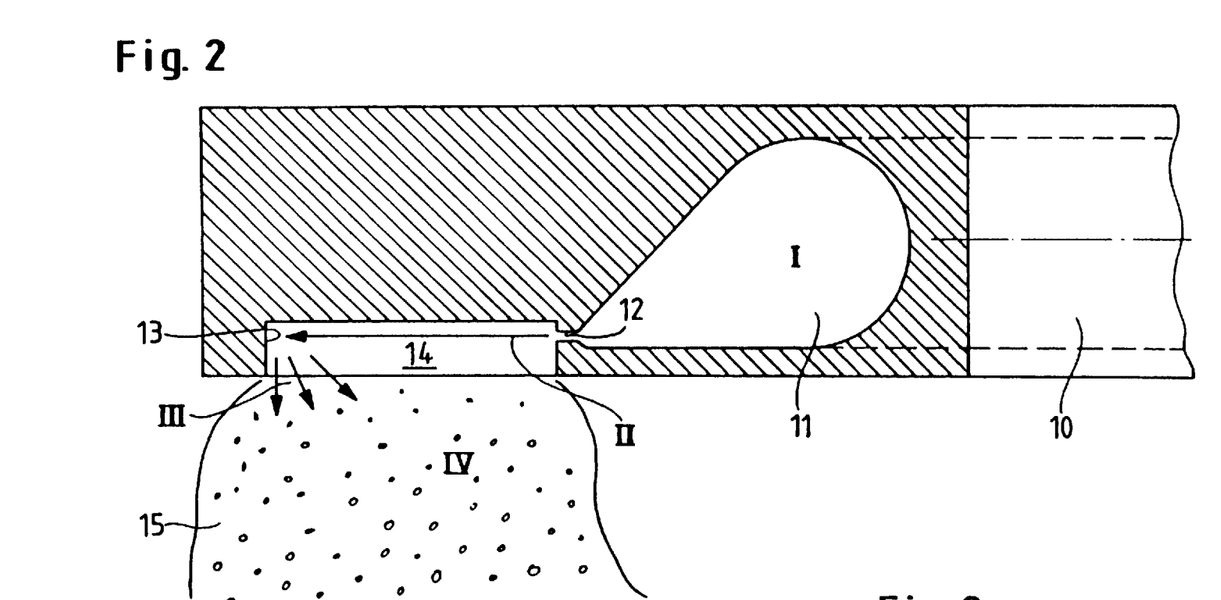
FIG. 2 shows a first device according to the invention for producing high shear forces in a slit and reducing the rate of flow of the reactive mixture by means of an impact surface.
Figure 2A:
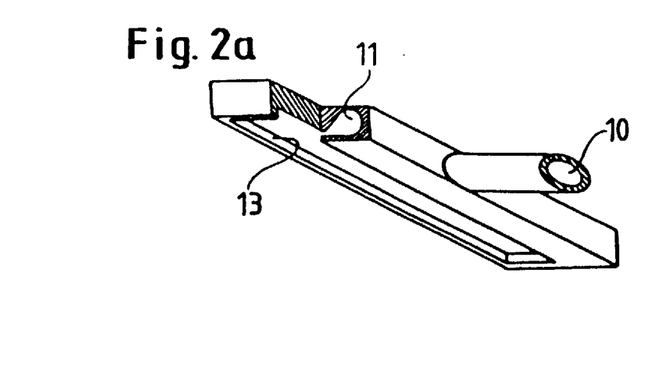
FIG. 2a shows a view in perspective of the device according to FIG. 2.

FIG. 2 shows a section through the device for producing foam according to the invention which is shown in perspective in FIG. 2a. The reactive mixture is introduced into the extended distribution chamber 11 from the mixing head (not shown) via pipe 10. The opening with a small dimension is in the form of an extended slit 12 at right angles to the plane of the drawing in FIG. 2. A stream of reactive mixture in the form of a sheet, indicated by arrow II, emerges from slit 12 at right angles to the plane of the drawing and impinges on impact surface 13 facing slit 12. The high rate of flow of the reactive material is thereby turbulently reduced. The volume of the deflection chamber 14 is selected so that the residence time produced for the reactive mixture therein is such that carbon dioxide is essentially still not released during this time. Only after the reactive mixture emerges from the deflection volume 14 is carbon dioxide released therefrom with the formation of foam 15.

Figure 3:
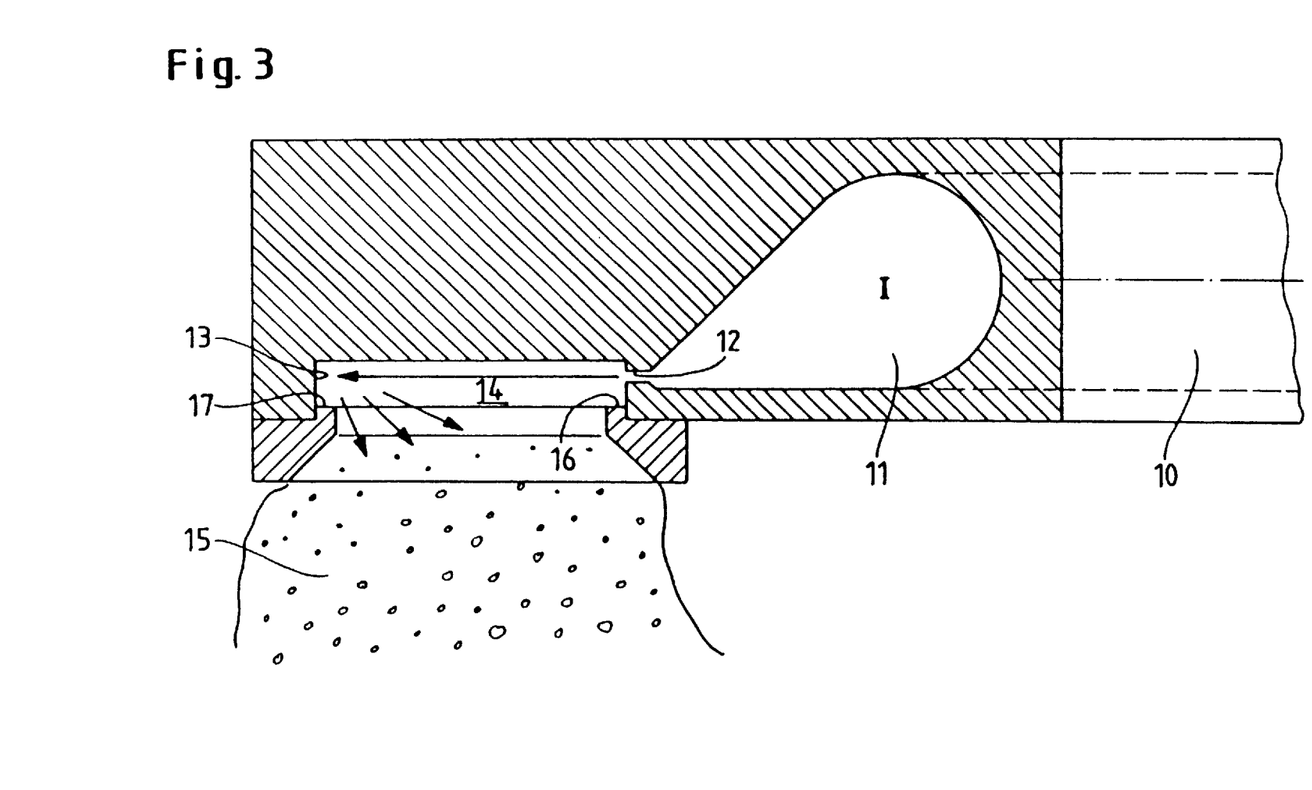
FIG. 3 shows an improved embodiment of the device according to FIG. 2.

An improved turbulent reduction in the high exit speed of the reactive material from slit 12 is achieved when boundary edges 16 and 17 for the deflection chamber 14 are provided in accordance with FIG. 3. Otherwise the drawing in accordance with FIG. 3 corresponds to that in accordance with FIG. 2.

Figure 4:
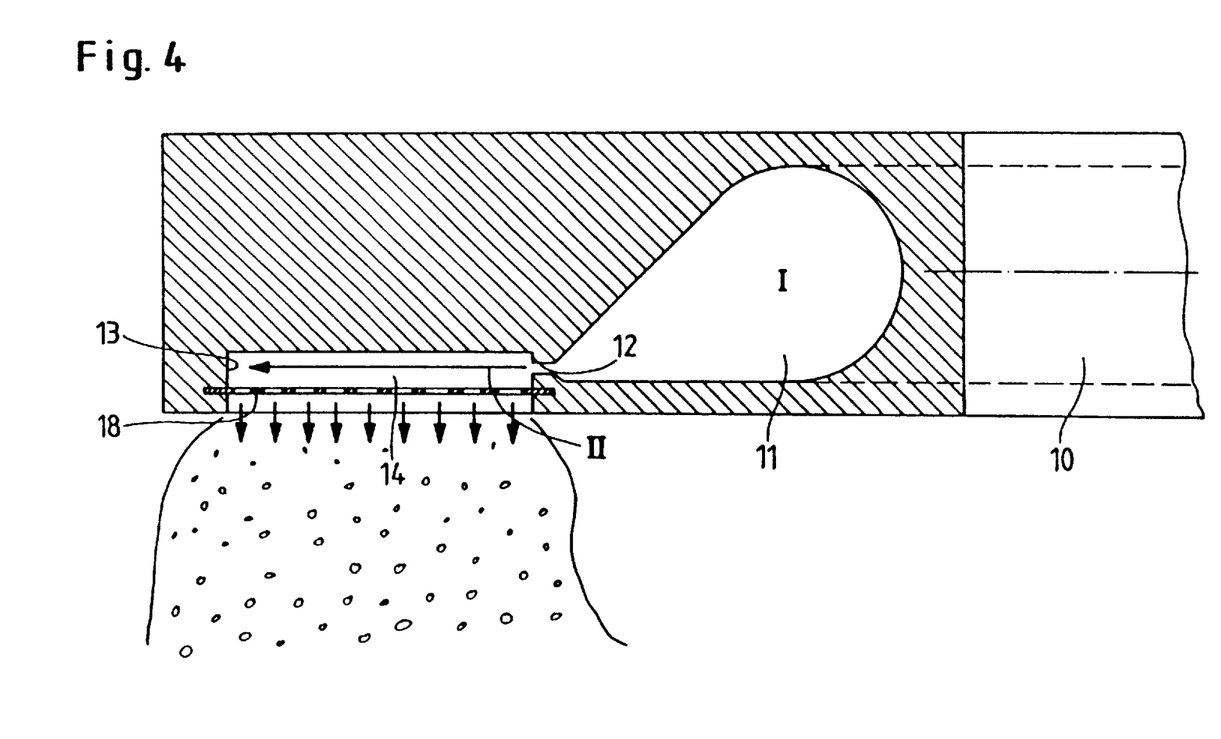
FIG. 4 shows a device according to FIG. 2, in which an additional stabilising sieve is provided.

FIG. 4 shows a foam-forming device according to the invention in which deflection chamber 14 is restricted by perforated plate 18 as a flow-stabilising element.

Figure 5:
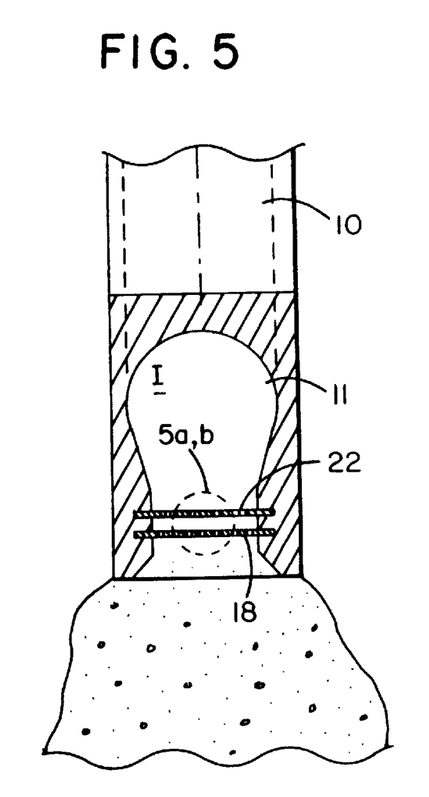
FIG. 5 shows a device according to the invention with a perforated plate for producing high rates of shear and a sieve which is used simultaneously as an impact surface and for stabilising the flow.
Figure 5A:
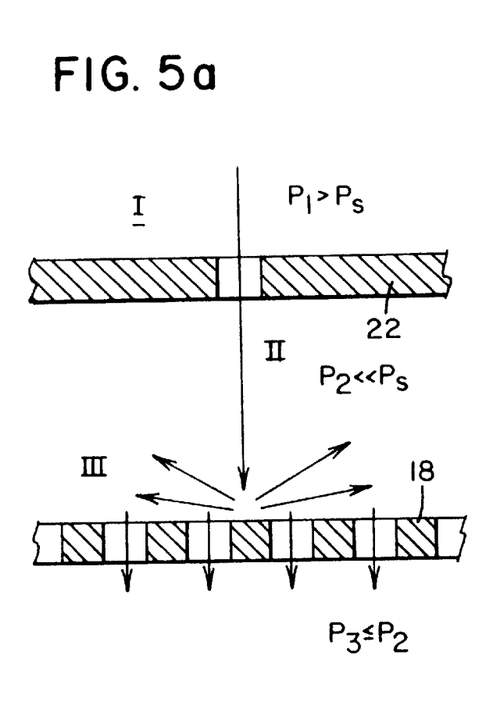
FIG. 5a shows an enlarged detail of the embodiment according to FIG. 5.
Figure 5B:
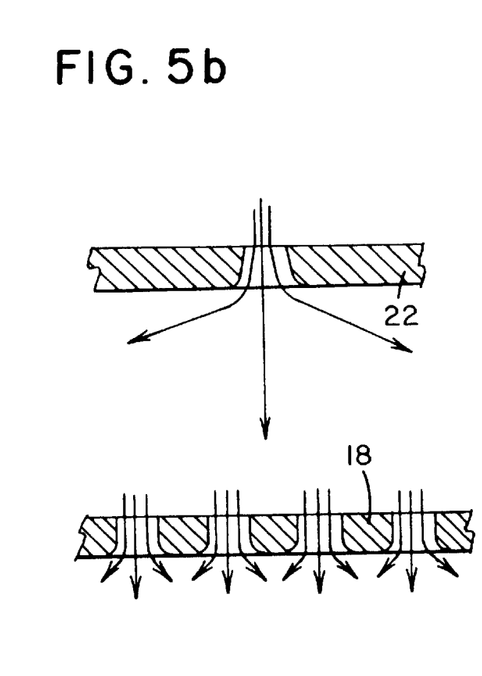
FIG. 5b shows a version corresponding to FIG. 5a, but with a preferred contour for the passageways.

FIG. 5 shows a device which is analogous to the preceding figures, wherein a perforated plate 22 is provided as an element for producing high rates of shear. The stabilising sieve 18 is used, as is shown in FIG. 5a, which is an enlarged detail "A" from FIG. 5, both as an impact surface and for stabilising the flow of the reactive mixture. FIG. 5b shows the material flows fanning out due to the widening contours on the exit side of the passageways.

Figure 6:
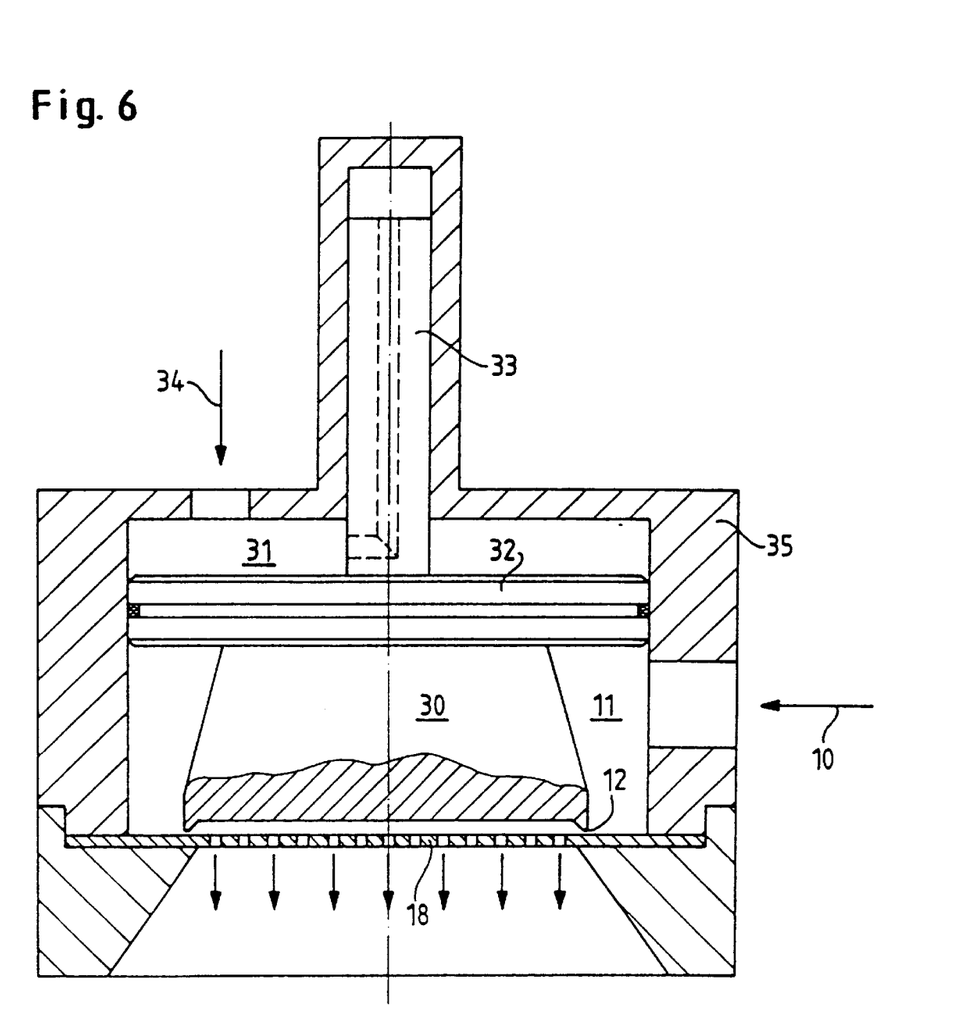
FIG. 6 shows a device according to the invention with a variable slit width.

FIG. 6 shows a device for producing foam according to the invention with circular symmetry with an annular slit 12 for producing the high rates of shear. The upper boundary of annular slit 12 is formed by a central body 30 which is surrounded by a circular distribution chamber 11. Circular chamber 11 is sealed tightly against housing 35 by means of a piston 32 connected to the central body 30. Piston 32 can be moved vertically to adjust the width of the annular slit 12 by introducing a hydraulic liquid 34 into space 31 above piston 32. Piston 32 can also be provided with a guide piston 33 for preventing piston 32 from tilting in housing 35.

Figure 7:
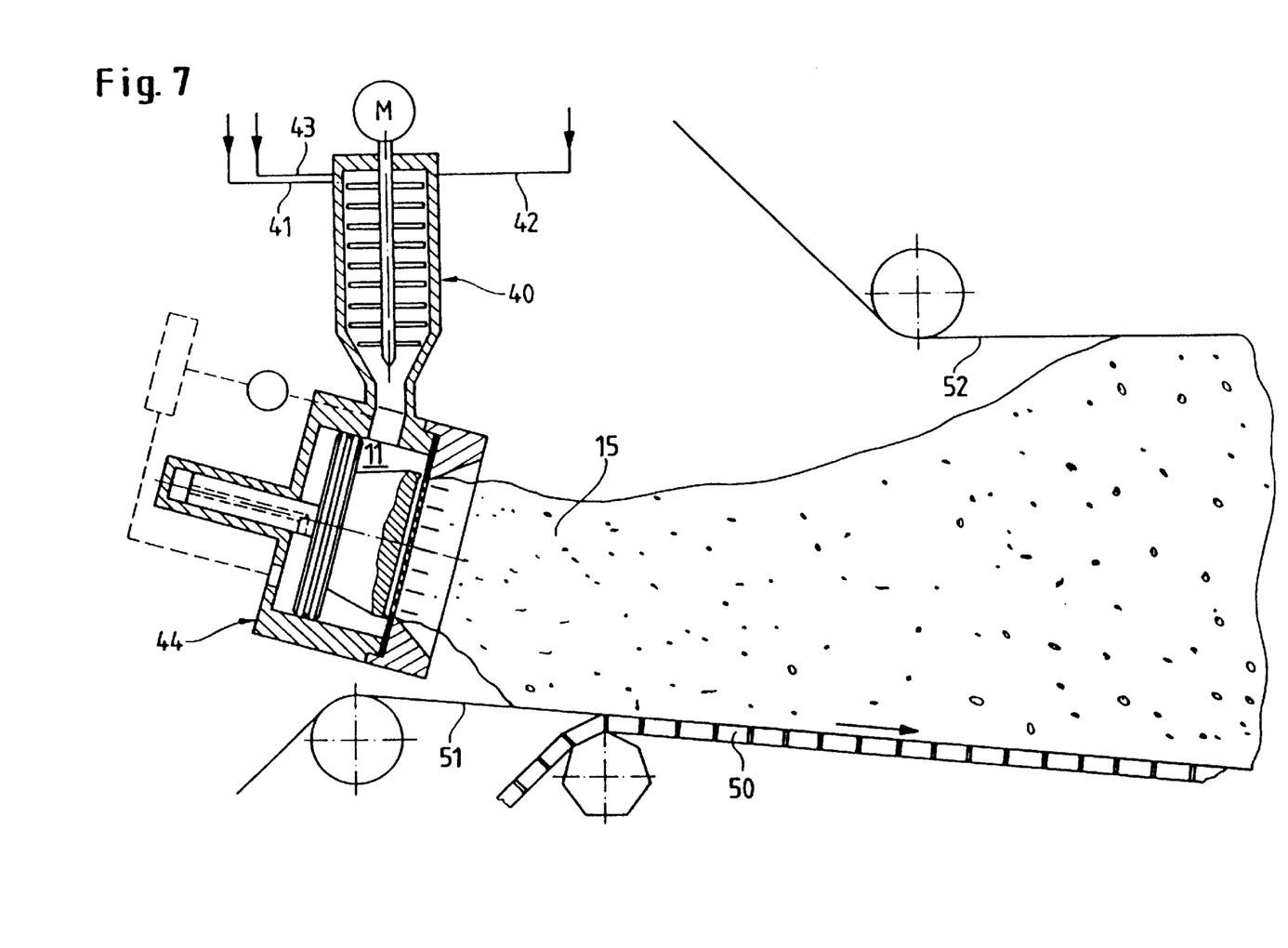
FIG. 7 shows the main process for preparing slabs of foam using a foam producing device in accordance with FIG. 6.

FIG. 7 shows a unit for producing slabs of foam. The polyol component 41, the isocyanate component 42 and other auxiliary agents and additives are supplied to the mixing apparatus 40 via piping 43. The polyol component 41 preferably contains carbon dioxide dissolved under pressure. From the mixing apparatus 40, the now mixed components are introduced into distribution chamber 11 of the foam-forming device 44. Foam-forming unit 44 shown as an example corresponds to the drawing in accordance with FIG. 6. The foam 15 emerging from foam-forming device 44 is deposited on a lower laminating film 51 which is moved away from the foam-forming device 44 on a conveyer belt 50. Furthermore, an upper laminating film 52 may be supplied from above.

Figure 8:
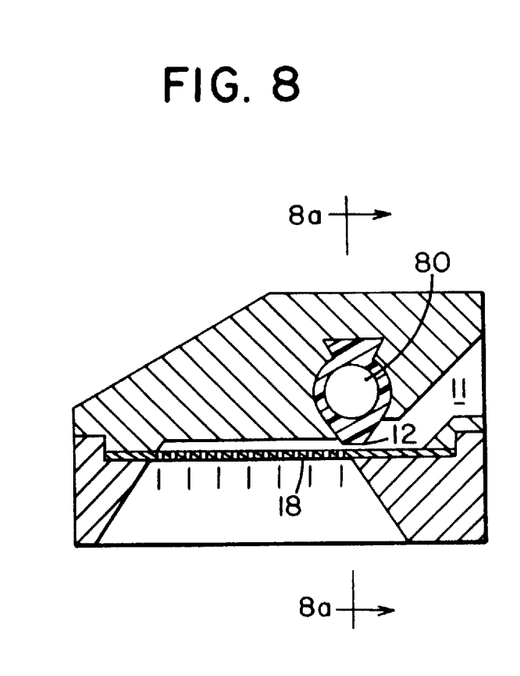
FIG. 8 shows an alternative embodiment of the device according to the invention in accordance with FIG. 7 with a pneumatically adjustable slit.

FIG. 8 contains an alternative proposal for a foam-forming device according to the invention with an extended, adjustable slit. Here, the boundary surface of slit 12 is formed by an elastic polymer tube 80 which can be pneumatically or hydraulically expanded to adjust slit 12.

Figure 8A:
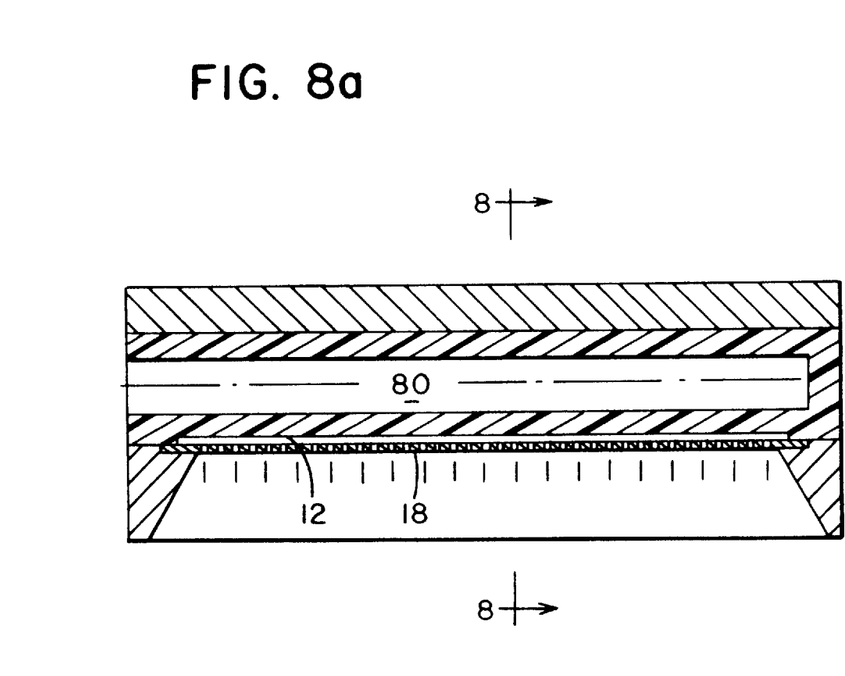
FIG. 8a shows a second view of the device in accordance with FIG. 8.

FIG. 8a shows a section A—A through FIG. 8. FIG. 8 represents a section B—B through FIG. 8a.

Figure 9:
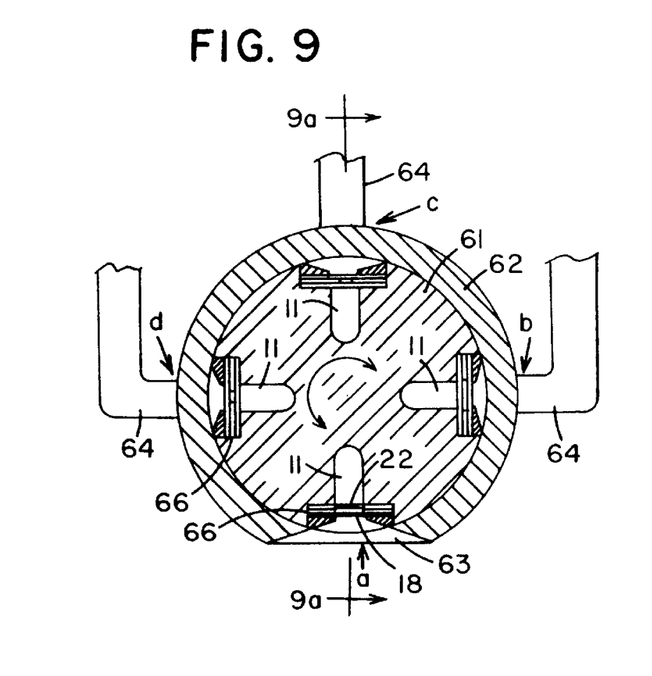
FIG. 9 and FIG. 9a show sections through several foam devices in accordance with FIG. 5 integrated into one magazine.
Figure 9A:
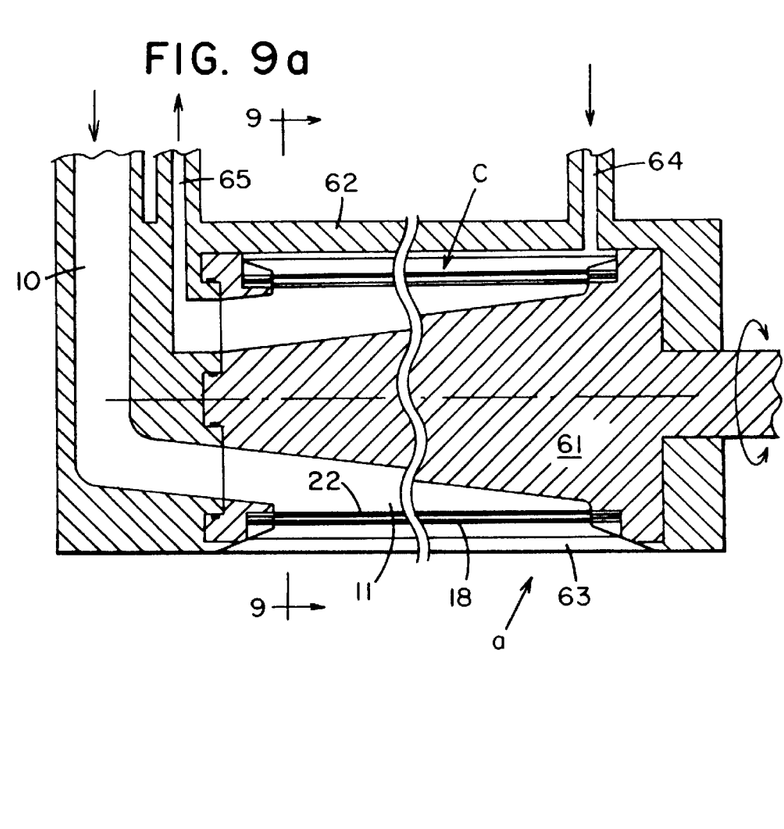

FIGS. 9 and 9a show a cross-section and longitudinal section through a foam device according to the invention, in which 4 foam devices a, b, c and d, as shown in principle in FIG. 5, are integrated in the form of a magazine in an essentially cylindrical carrier 61. The carrier 61 is arranged so that it can rotate about an axis in a cylindrical cage 62. The cylindrical cage 62 has an opening 63 along a line in the jacket parallel to the axis through which the foam can emerge from the particular foam device which is in operation. Furthermore, the distribution channel 11 associated with the particular foam device in operation (in the drawing foam device a) is filled with reactive mixture via feed pipe 10 which passes into cage 62. Furthermore, feed pipes 64 are provided to at least one of the foam devices not in operation (b, c and/or d) which are enclosed in cage 62, and cleaning liquid is supplied through these. Corresponding discharge channels 65 are provided for the cleansing liquid. The foam device magazine shown in FIGS. 9 and 9a enables the foam device to be changed in the shortest possible time during operation, if the perforated plate 22 of the foam device in operation is blocked by foreign particles from the polyurethane reactive mixture or by polyurethane which has hardened on the wall of the piping and then been dislodged. The rinsing out liquid (usually polyol) is preferably passed in the opposite direction (as compared with the reactive mixture during the foaming process) through the foam device which is not in operation.

Figure 10:
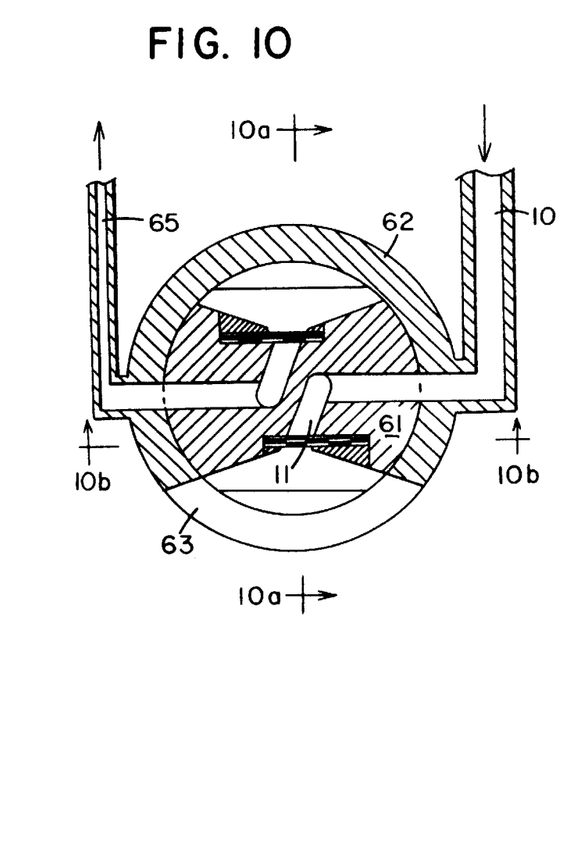
FIGS. 10, 10a, 10b and 10c show a magazine with two foam devices in accordance with FIG. 5, wherein the effective perforated plate area is designed to be continuously variable.
Figure 10A:
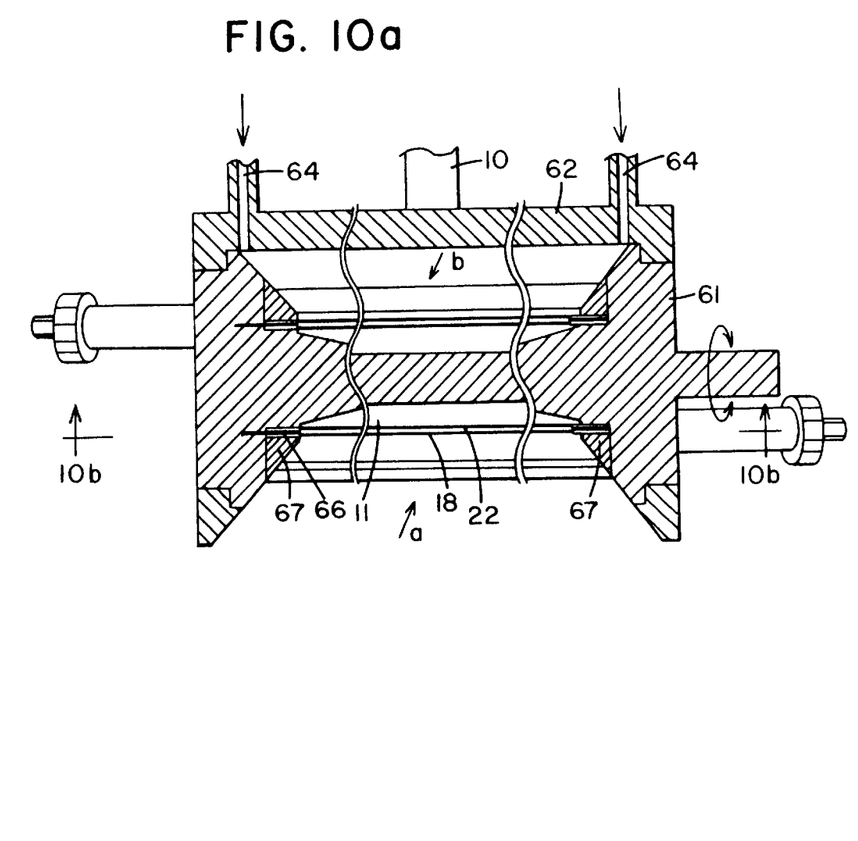
Figure 10B:
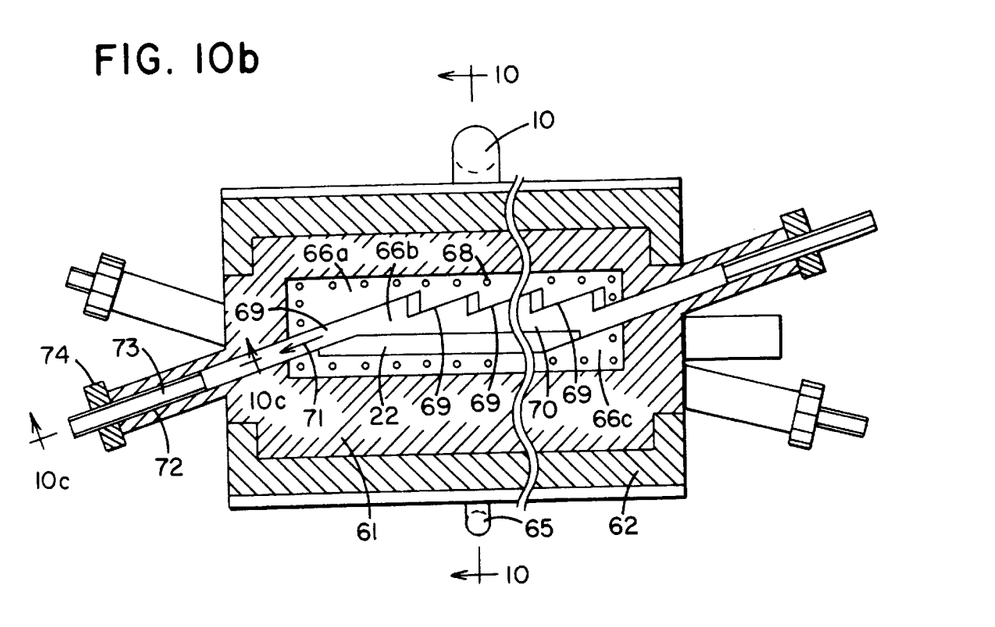
Figure 10C:
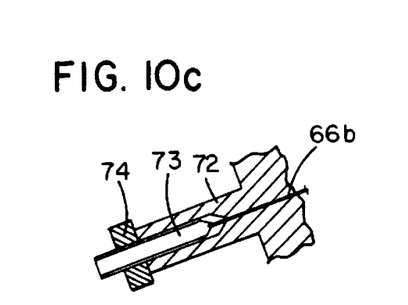

In order to achieve the operational states "foaming" and "rinsing with cleansing liquid" it would be sufficient to provide a magazine with only 2 foam devices. According to the invention, however, 4 to 12 foam devices are preferably integrated in one magazine, wherein the foam devices differ with regard to the diameter of the holes in perforated plates 18 and 22 and/or the number of holes (free passage area), pairs of foam devices being designed to be identical. In this way, an optimally adapted foaming device may be selected for the particular reactive mixture (viscosity, temperature, carbon dioxide content) at the start of the operation and then expansion may be performed alternately with this and the foam device which is identical to it. FIG. 9 indicates that the spacers 66 between perforated plates 22 and 18 may be constructed as diaphragms which restrict the effective cross-section of perforated plates 18 and 22. In the embodiment shown, the effective cross-section in foam devices c and d is reduced as compared with foam devices a and b by diaphragms 66. The effective cross-section of perforated plate 22 can typically be between 3 and 15 mm (cross-sectional size in accordance with FIG. 9) and the longitudinal extension of perforated plate 22 can be between 150 and 800 mm (longitudinal size in accordance with FIG. 9a). FIGS. 10 and 10a show a magazine of foam devices according to the invention, analogous to FIGS. 9 and 9a, wherein only two foam devices a and b are provided. The supply 10 of the reactive mixture does not take place via the head of the cylindrical cage 62, in contrast to the embodiment in FIG. 9a, but in the middle of the longitudinal length of the cylindrical cage so that the flow route for the reactive mixture in distribution channel 11 only stretches over half the longitudinal length of the cylindrical cage. According to the invention, the spacer 66 between perforated plates 22 and 18 is designed to be a continuously adjustable diaphragm in the embodiment in accordance with FIGS. 10 and 10a, so that the effective areas of perforated plates 22 and 18 can be continuously modified. This is explained in more detail in FIGS. 10b and 10c. FIG. 10b shows a section B—B through the diagram in accordance with FIGS. 10 and 10a so that diaphragm 66 can be viewed (after removal of perforated plate 18). The spacer 66 between perforated plates 18 and 22 consists of 3 sections, 66a, 66b and 66c, which cover perforated plate 22 in the diagram in FIG. 10b except for the visible effective cross-section. Spacer sheets 66a and 66c are fixed in place. They are screwed against the cylindrical body 61 together with perforated plates 22 and 18 and take the pressure of the reactive mixture on perforated plate 22. The adjustable section of the diaphragm, 66b, and spacer plate 66a have saw-tooth shaped sliding surfaces 69 which shift the edge of the diaphragm 70 of diaphragm 66b transversely over perforated plate 22 when moved in the direction of arrow 71. Diaphragm 66b has extensions which can be moved and which project out of the cylindrical body 61 at the angle of sliding surfaces 69 and are connected to screw 73. Screw 73 is guided inside a casing 72 and can be moved in the direction of arrow 71 by means of nut 74. Spacer sheets 66a and 66c may have a thickness of 0.5 to 4 mm, preferably 1 to 2 mm, according to the invention. The moveable diaphragm 66b preferably has a thickness which is 0.01 to 0.05 less than that. The foaming process is preferably started with the largest possible effective area for perforated plate 22 and as it progresses, the effective area of perforated plate 22 is continuously decreased until an optimum foam structure is obtained.

EXAMPLE

A unit according to FIG. 7 is used for the production of polyurethane foam. The conveyor belt speed is 7 m/min. The width of the conveyor belt is 2 m, the distance between the upper laminating film 52 and the lower laminating film 51 is 1.2 m. Instead of foam-forming device 44 a foam-forming device according to FIG. 5 is used. The perforated plates 22 and 18 each formed an area not covered by flanges and supports of 1.3 cm in width and 70 cm in length. The thickness of the perforated plates was in each case 0.2 mm. Per $cm^2$ the perforated plate 22 had 256 perforations each of a diameter of 0.1 mm on the inlet side, which widened to approximately 2.5 times the diameter in the direction of flow. The free throughflow area of all the perforations was about 1.82 $cm^2$.

The distance between the perforated plate 18 (stabilisation grid) and the perforated plate 22 was 1 mm. Per $cm^2$ it had 3000 holes each of a diameter of 0.1 mm on the inlet side which widened to 2.5 times the diameter.

In the mixing apparatus 40 (FIG. 7) an expandable reactive mixture of the following composition is produced:

100 parts by weight of a polyether polyol with an OH number of 45, containing 85% by weight of propylene oxide units and 15% by weight of ethylene oxide units, initiated with trimethylolpropane, 4.2 parts by weight of water, 4.0 parts by weight of $CO_2$, 1.3 parts by weight of a silicone stabiliser, 0.15 parts by weight of an amine catalyst, 0.16 parts by weight of tin octoate and 50 parts by weight of toluylene diisocyanate 80/20.

The polyol, water and liquid $CO_2$ are pre-mixed in a static mixer at 70 bars, the pressure of the mixture is reduced to 15 bar and it is introduced via feed line 41 into mixing apparatus 40, in which it is mixed with the isocyanate and the other additives.

The pressure at the exit to the mixing chamber was 11 bars. 270 kg of reactive mixture were conveyed per minute. The rate of shear as the mixture passes through the perforated plate 22 (FIG. 5) is calculated to be $1.3 \cdot 10^6$/sec.

The reactive mixture foamed as it issued from the foam-forming device in the form of a stable, greatly expanding froth, which spread over the conveyor belt. Only a few meters downstream of the point of deposition on the conveyor belt the froth began to rise due to the reaction of the water with the isocyanate. After about 12 m the maximum slab height of 1.2 m was reached.

A foam slab with a density of 16.1 kg/$m^3$ was obtained. The foam was open-pored and had 16 to 19 pores per cm. It was substantially free of voids and pores with diameters higher than 2 mm.

We claim:

1. A process for producing polyurethane foam materials from two reactive components using carbon dioxide as a blowing agent by mixing at least one of the reactive components with carbon dioxide under pressure, mixing the reactive components, at least one of which contains carbon dioxide under pressure, suddenly expanding the reactive mixture containing carbon dioxide by passing the reactive mixture through at least one opening extending to less than 1 mm in at least one dimension with the production of high rates of shear, reducing the flow velocity of the expanded mixture and stabilizing the flow of the mixture by passing it through a sieve having a free cross sectional area which is 5 to 100 times larger than the total free cross sectional area of the at least one opening through which the mixture is expanded.

2. A process according to claim 1, characterised in that the reactive mixture is expanded through a slit or a sieve.

3. A process according to claim 1, characterised in that the direction of flow of the reactive mixture is deflected by an angle of at least 70° to reduce the speed.

4. A process according to claim 1, characterised in that the average residence time of the reactive mixture between expansion and stabilisation is less than 100 msec.

5. The process according to claim 1, wherein the reactive mixture contains water as an auxiliary blowing agent.

6. The process according to claim 2, wherein the reactive mixture is expanded by being passed through one or more sieves within a time of less that 0.001 seconds.

7. The process according to claim 1, wherein the velocity of the reactive mixture after expansion and prior to reduction of velocity is 10 to 50 m/s.

* * * * *